United States Patent
Dubinsky (10) Patent No.: US 7,290,152 B2
(45) Date of Patent: Oct. 30, 2007

(54) METHOD AND SYSTEM FOR MANAGING POWER WITHIN A COMPUTE COMPONENT OF A MULTIPROCESSOR SYSTEM

(75) Inventor: Dean V. Dubinsky, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 10/334,293

(22) Filed: Dec. 30, 2002

(65) Prior Publication Data

US 2004/0128564 A1 Jul. 1, 2004

(51) Int. Cl.
*G06F 1/32* (2006.01)
(52) U.S. Cl. .................. 713/300; 713/320; 713/324
(58) Field of Classification Search ......... 713/300–375
See application file for complete search history.

(56) References Cited

U.S. PATENT DOCUMENTS

| | | | |
|---|---|---|---|
| 5,566,297 A | 10/1996 | Devarakonda et al. | 395/182.13 |
| 5,787,297 A * | 7/1998 | Lin | 713/322 |
| 5,802,305 A | 9/1998 | McKaughan et al. | 709/227 |
| 5,867,704 A | 2/1999 | Tanaka et al. | 395/675 |
| 5,913,068 A * | 6/1999 | Matoba | 713/322 |
| 5,996,083 A * | 11/1999 | Gupta et al. | 713/322 |
| 6,000,036 A * | 12/1999 | Durham et al. | 713/320 |
| 6,058,445 A | 5/2000 | Chari et al. | 710/103 |
| 6,098,158 A * | 8/2000 | Lay et al. | 711/162 |
| 6,105,089 A | 8/2000 | Chari et al. | 710/103 |
| 6,134,615 A * | 10/2000 | Chari et al. | 710/302 |
| 6,226,667 B1 | 5/2001 | Matthews et al. | 709/203 |
| 6,266,776 B1 * | 7/2001 | Sakai | 713/300 |
| 6,604,201 B1 * | 8/2003 | Takahashi et al. | 713/323 |
| 6,711,691 B1 * | 3/2004 | Howard et al. | 713/300 |
| 6,745,335 B1 * | 6/2004 | Kusano | 713/324 |
| 6,836,849 B2 * | 12/2004 | Brock et al. | 713/310 |
| 6,901,522 B2 * | 5/2005 | Buch | 713/320 |
| 2002/0007463 A1 | 1/2002 | Fung | 713/220 |

FOREIGN PATENT DOCUMENTS

| | | |
|---|---|---|
| EP | 0658843 | 6/1995 |
| EP | 1037133 | 9/2000 |

OTHER PUBLICATIONS

"Advanced Configuration and Power Interface Specification", Jul. 27, 2000, Revision 2.0.

* cited by examiner

*Primary Examiner*—Rehana Perveen
*Assistant Examiner*—Paul Yanchus, III
(74) *Attorney, Agent, or Firm*—Lieberman & Brandsdorfer, LLC (57) ABSTRACT

A power management system (100) for a multiple compute component system (30). The management system (100) enables operational management of individual compute components (40, 50) in two low power states of operation, suspend (158) and hibernate (164). In addition, the management system (100) enables granular management (110, 112) of power consuming accessories (44, 190) within an individual compute component. When a compute component is in the low power state of suspend (158) or hibernate (164), it may be hot-swapped to a different locale. In addition, when a compute component is restored from a low power state of hibernate (164), it may access an alternate image in the system. Accordingly, the power management system (100) allows for five state of operation of an individual component in a multiple compute component system.

20 Claims, 5 Drawing Sheets

METHOD AND SYSTEM FOR MANAGING POWER WITHIN A COMPUTE COMPONENT OF A MULTIPROCESSOR SYSTEM

BACKGROUND OF THE INVENTION

1. Technical Field

This invention relates to an apparatus and method for managing power consumption in a computing environment. More specifically, the invention relates to management of individual compute components in a multiple compute component environment.

2. Description of the Prior Art

Laptop computers are personal computers that generally include a microprocessor, hardware storage, an I/O port, and a communication port. The laptop may function independently for personal computing needs, or if it includes a network adaptor or modem, the laptop may become part of a local area or wide area network.

One of the features present on today's laptop and personal computers is the ability of the computer to be placed in a low power state of operation, such as Suspend and Hibernate. Both of these low power states of operation are known in the art in relation to personal computers. In the Suspend state, power to the processor or other accessories on the motherboard is turned off, but the memory remains intact. This is a state of low power consumption. When the operator of the computer wants to regain usage of the hardware accessory, the operator must Restore full power to the processor, the motherboard, and the associated hardware accessories, although a full system restart is not necessary since the memory remains intact. In addition to the Suspend state, the personal computer may also be placed in the low power state of Hibernate where power to the computer is turned off following placement of the memory to disc. Therefore, in general it is less time consuming to enter the Suspend state and Restore power to the computer or to enter the Hibernate state and Resume power to the computer, rather than to terminate power to the computer and restart the full system at a later time. Accordingly, use of the Suspend state on the laptop or personal computer is one example of power management on a personal computer system.

A multiprocessor computer system by definition contain multiple processors, also referred to herein as CPUs, that can execute multiple processes or multiple threads within a single process simultaneously in a manner known as parallel computing. In general, multiprocessor systems execute multiple processes or threads faster than conventional uniprocessor systems, such as personal computers (PCs), that execute programs sequentially. The actual performance advantage is a function of a number of factors, including the degree to which parts of a multithreaded process and/or multiple distinct processes can be executed in parallel and the architecture of the particular multiprocessor system at hand.

The architecture of shared memory multiprocessor systems may be classified by how their memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory location, such systems are also called non-uniform memory access (NUMA) machines. In centralized shared memory machines, on the other hand, the memory is physically in one location. Centralized shared memory computers are called uniform memory access (UMA) machines because the memory is equidistant in time for each of the processors. Both forms of memory organization typically use high-speed caches in conjunction with main memory to reduce execution time.

Processor nodes may be grouped to form a partition, which is a collection of one or more nodes interconnected together to form a computing environment for an operating system. Multiple partitions can exist within the same computer system. Each partition within a computer system executes a single independent operating system image. A multiprocessor computer system may be in the structure of a collection of nodes or partitions, including service processor hardware, a management console and other infrastructure, representing a single manageable and configurable environment. Accordingly, a system can be split into multiple logical computer systems or partitions, each of which executes a single operating system image.

In addition to multiprocessor computing systems in the form of partitioned nodes, there are also bladed multiprocessing computing systems. The bladed system is a collection of distributed computing resources available over a local or wide area network that appears as one large virtual computing system to an end user or application. Each computing resource is a server on a removable card that plugs into a shared infrastructure which plugs into a rack. The computing resources may share a keyboard, a monitor, and a connection to the local or wide area network. Each resource within the system may be configured to function under different operating systems. Accordingly, a bladed multiprocessing system is an example of a scalable system with multiple resources adapted to communicate through common communication connections.

A partitioned multiprocessor computing environment and a bladed multiprocessor computing environment are both comprised of multiple compute components. Each component includes at minimum a printed circuit board with one or more microprocessors and a communication port. Current management of multiple compute component systems, including bladed computer systems as well as partitioned computer systems, require shut-down of a specific compute component when maintenance is required. Each component operates in one of two states, on or off. There is no intermediate state of operation. This affects power management of a component or power consuming accessory on a component, as well as scheduled and unscheduled maintenance of a component. Accordingly, there is a need to enable intermediate states of operation of a component in a computer system to enable effective power management of components within a networked computing environment.

SUMMARY OF THE INVENTION

This invention comprises a power management system within a multiple compute component computing environment. The system manages power on both a macro-scale and a micro-scale level of operation.

In a first aspect of the invention, a method for managing power within a compute component is provided. The method includes an analysis of power consumption of the component, a determination of a level of power consumption required for the component based upon the power consumption analysis, and responsively modifying a state of operation of the component. The method may also include controlling granular management of a power consuming accessory within the component. Such accessories may include a microprocessor, a disk drive, an I/O port, and/or a chip. The step of modifying a state of operation of the component may include use of a switch, or a software management system. The state of operation of the compute component includes maximum power, selective reduction of a hardware accessory, suspend, hibernate, resume, restore, and off. When the compute component is returning from a low power state of operation, the component may access an alternative image of a network storage device. In addition, when the component is operating in a low power state, the component may be hot-swapped. A low power state of operation includes a suspended state and a hibernated state.

In a second aspect of the invention, a multiprocessor computing system is provided with a plurality of compute components. A manager analyzes power consumption of the components and is adapted to invoke a modification of a state of operation of the component in response to the analysis. Modification of a state of operation may include granular management of a power consuming accessory of the component, such as a microprocessor, a disk drive, an I/O port, and a chip. The state of operation may include maximum power, selective reduction of power, suspend, hibernate, resume, restore, and off. In addition, the system may include a storage manager adapted to instruct the component to access an alternative image stored in a network storage device during a restore function of the component. The component may also accommodate a hot-swap procedure when it is operating in a low power state, such as the Suspend or Hibernate states.

In a third aspect of the invention, an article is provided with a computer-readable signal-bearing medium. The article includes a manager to analyze power consumption of a compute component in a multiple compute component computing environment. A control system is provided in the medium. The control system is responsive to the manager for changing a state of operation of the compute component. The medium may be in the form of a recordable data storage medium or a modulated carrier signal. The state of operation of the component may include maximum power, selective reduction of a hardware accessory, suspend, hibernate, resume, restore, or off. The control system may be adapted to control operation of a power consuming accessory within the compute component. The power consuming accessory preferably includes a microprocessor, a disk drive, an I/O port, and/or a chip. In addition, the control system may access an alternative image within a network attached storage for the compute component when the component is returning from a hibernate state. The control system is also adapted to accommodate a hot-swap of the compute component when said component is operating in a low power state.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Power management of individual compute components in a multiple compute component system enhances operating efficiency of both the individual component and the system. Management of individual components may be on the level of placing an entire component into a low power state of operation. Alternatively, management of individual component may be in the form of granular management of a power consuming accessory in the compute component. Both forms of power management enhance efficiency and operation of the component and the system as a whole.

Technical Details

Figure 1:
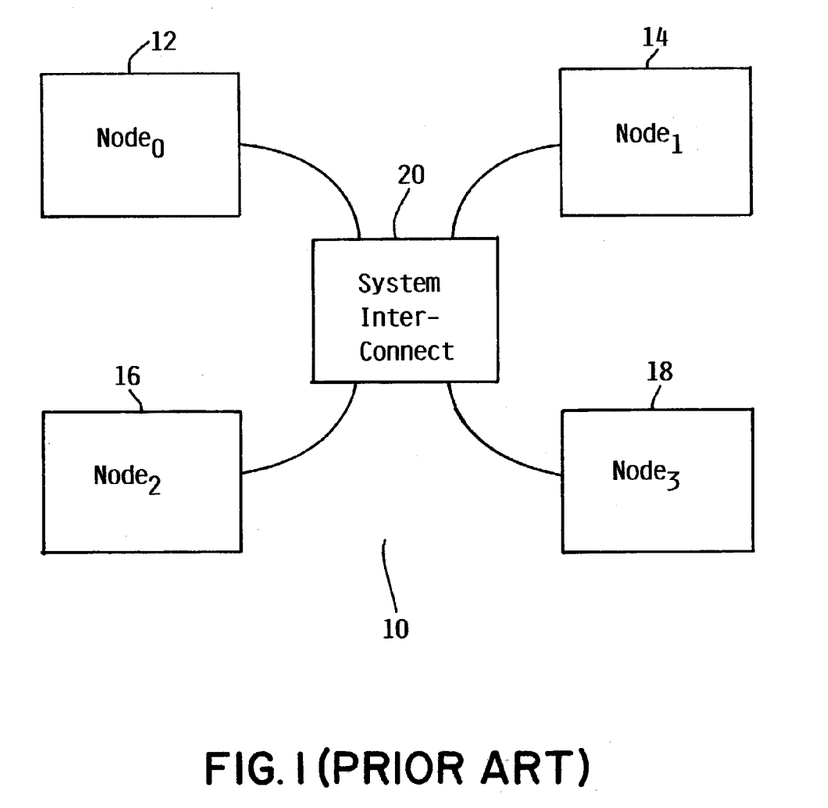
FIG. 1 is a block diagram of a prior art partitionable multiprocessor computer system.

As illustrated in FIG. 1, a multiprocessor system 10 may include multiple nodes. The system 10 uses a Distributed shared Memory (DSM) architecture, which may or may not be a Non-Uniform Memory Access machine (NUMA). As shown in FIG. 1, there are four nodes 12, 14, 16 and 18 that are each connected by a system interconnect 20 that permits any node to communicate with any other node in the system. The purpose of the system interconnect 20 is to allow processors in any node to access the memory resident in any other node in the system. The physical links of system interconnect 20 provide high bandwidth and low latency and are scalable to allow for the addition of more nodes in the system 10. Accordingly, the multiprocessor system 10 is an example of a partitionable computer system.

Figure 2:
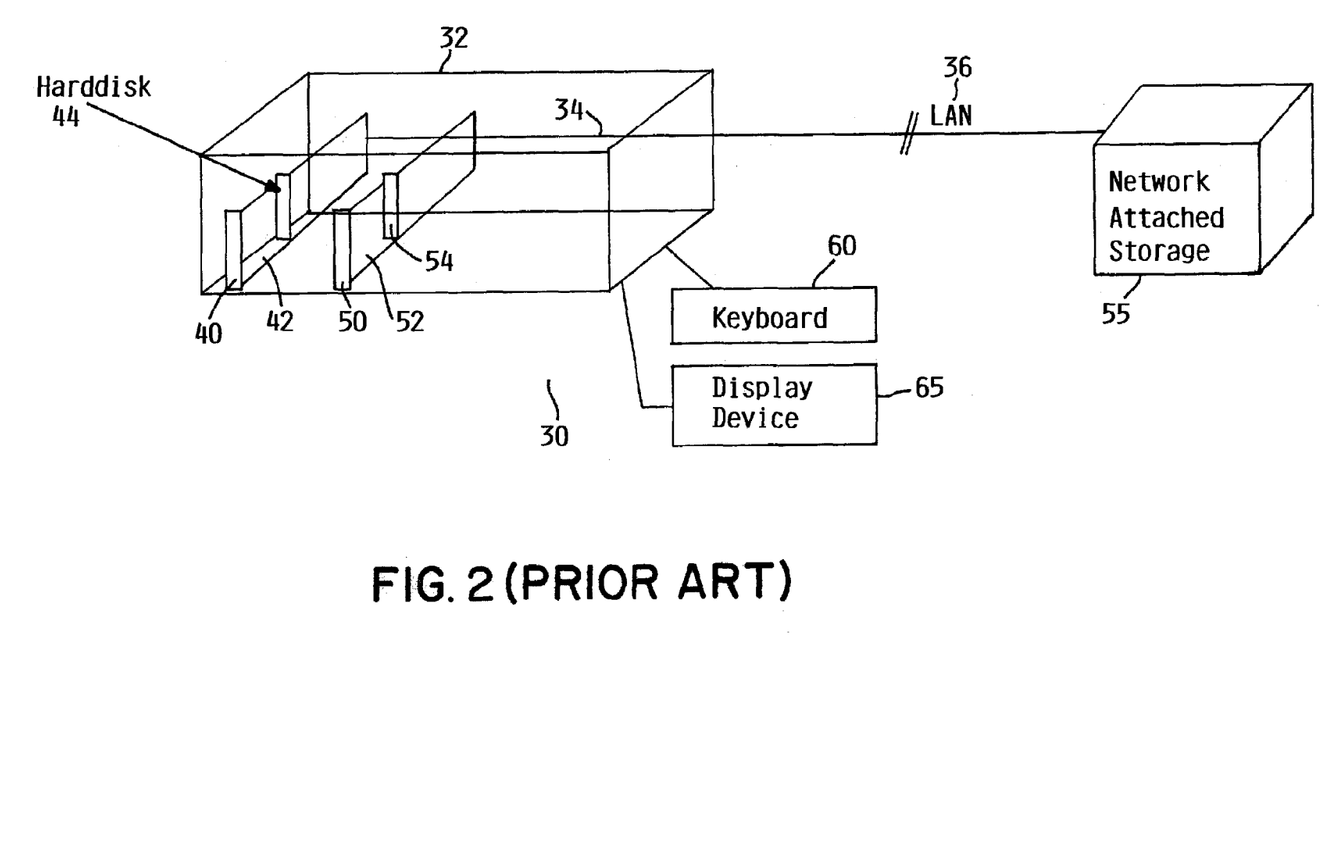
FIG. 2 is a diagram of a prior art bladed multiprocessor computer system.

The compute component in the system may be in the form of a partition within a partitionable system, a blade, or an equivalent partitionable compute component. The component is a printed circuit board that contains one or more microprocessors and a communication port, and it may optionally contain hardware accessories, such as storage hardware, memory, an I/O port, and a battery. FIG. 2 is an example of a multiple component system 30, with the components 40 and 50 stored in a chassis 32. Component$_1$ 40 is a printed circuit board 42 shown with a harddisk 42 and without a battery. Component$_2$ 50 is printed circuit board 52 shown with a battery 54, but without a harddisk. Both Component$_1$ 40 and Component$_2$ 50 have individual communication ports (not shown). The components, 40 and 50 share a communication line 34 to a local area network 36. As shown, the local area network 36 is in communication with both Component$_1$ 40 and Component$_2$ 50. The chassis 32 is an enclosure adapted to store one component or a plurality of components. All of the components within the chassis 32 share a keyboard 60, a display device 65, and the communication line 34 to the local area network 36. The chassis 32 is also used to provide external power to each of the components. Both components 40 and 50 are shown connected to a network attached storage 55 through the local area network 36. Since Component$_1$ 40 has it's own harddisk it may store data locally on it's own storage hardware, or it may write it's storage information directly to the network attached storage 55. Alternatively, Component$_1$ 40 may use it's access to the local area network 36 to store data in a central location.

In the prior art, each compute component in a multiple component computer system has the ability to run in one of two states of operation, maximum power or no power. In the preferred embodiment, each component may operate in one of five states, two of the states being maximum power or no power. The three remaining states are intermediate states of operation. The first of the three intermediate states of operation is a selective reduction of power. This state enables the component to continue operation, but may not provide optimum performance of the full capabilities of the component and any associated power consuming accessories. The second of the three intermediate states of operation is known as Suspend. This state enables the component to continue operating in a low power state. In order to select the Suspend state, the component must have a battery or remain in communication with a power source. To return the component to full power from the Suspend state, the operator must Resume power to the component. The Resume procedure returns the component to full operating power without requiring a reboot of the component. The third intermediate state of operation is known as Hibernate. In the Hibernate state, all memory contents of the compute component are written to network attached storage, and a marker is sent to the operating system not to boot when the component is restored. The marker will indicate to the operating system to retrieve the memory contents stored in the network attached storage. This enables the component to return to a medium or full power state of operation faster than that provided from a reboot of the component. The Hibernate state requires the component to write it's memory to storage prior to termination of power. When the operator wants to return the component to full power from the Hibernate state, they must Restore the component. The process of restoring the component involves retrieving memory that was stored to the local disc or network attached storage. The three intermediate states of operation enable the operator to return full power at a later time without requiring a complete shutdown of power followed by a rebooting of the component. In each of the intermediate states of operation, less power is consumed by the component and the selected power consuming accessories of the component. Accordingly, the three intermediate states of operation enable an operator of the system to flexibly manage distribution of power to the partitionable components in the computing environment.

Figure 3:
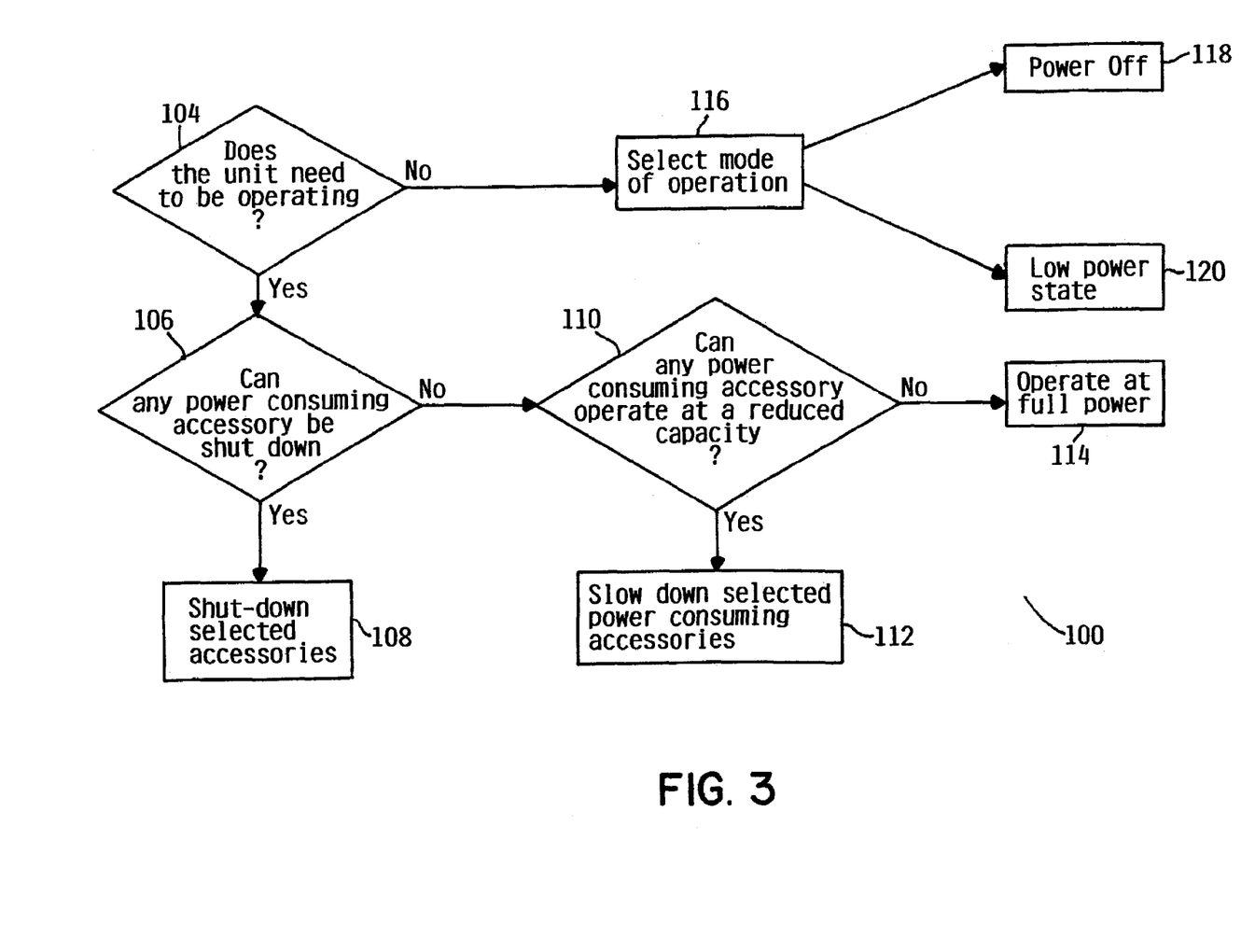
FIG. 3 is a flow chart illustrating granular power management of a compute component according to the preferred embodiment of this invention, and is suggested for printing on the first page of the issued patent.

There are several embodiments which may enable the compute component within the computing system to enter one of the three intermediate states of operation. In one embodiment, system management software may be invoked to control the states of operation of the component, as well as power consuming accessories within a component. FIG. 3 is a flow chart 100 illustrating the process of managing power of a compute component on a granular level, i.e. the component as well as power consuming components of the component. The first step in managing power is to determine if the component requires continued operation 104. This includes analyzing power consumption of the component and determining utilization of the component within the system. If operation of the component is not required, then a selection of a desired low power or no power state of operation is required 116. The state may include shutting off power to the component 118 or placing the component in a low power state 120. If operation of the component is required, the next step is to determine if any of the power consuming accessories are required for operation 106, i.e. if they are being utilized. Power consuming accessories that are not required for operation can be selectively shut-down 108. However, if any of the component accessories are required to be in an operating state, it must then be determined if any of the accessories can operate at a reduced capacity 110. These selected power consuming accessories would then be slowed down on an individual basis 112. For example, a processor that has the capacity to operate at two gigahertz speed may be slowed down to five hundred megahertz to conserve energy. If it is determined that the power consuming accessories cannot operate at a reduced capacity, then they must all remain operating at full power 114. Accordingly, the system management software enables power management of individual components in a multi-compute component system, as well as granular power management of power consuming accessories within individual components.

Figure 4:
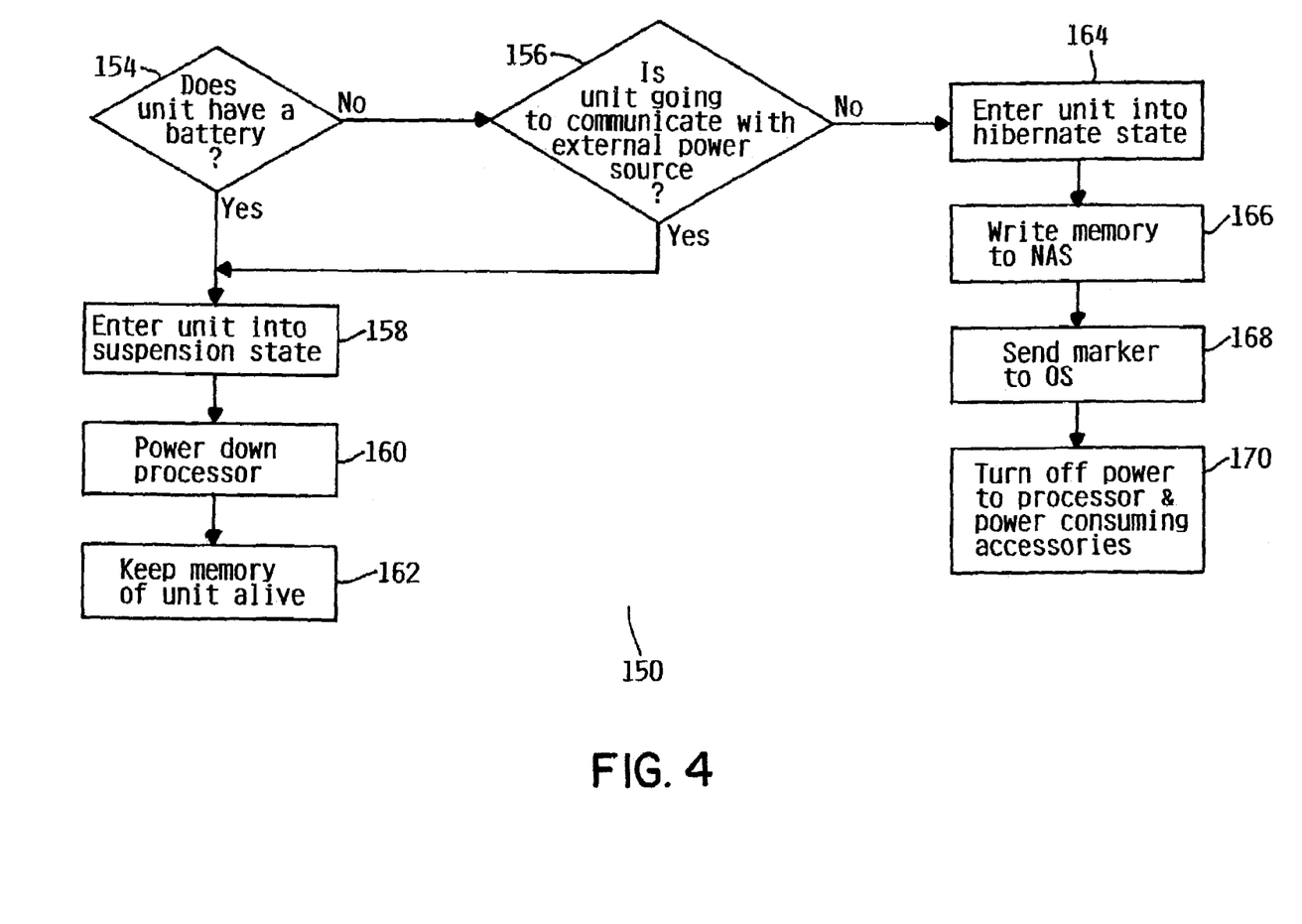
FIG. 4 is a flow chart illustrating selection of a low power state of operation of a compute component.

The power management software enables operational control of individual components in a multi-component system. As noted above, each component in the system may operate in a low power state, i.e. step 120. The low power states are known as Hibernate and Suspend. FIG. 4 is a flow chart 150 illustrating the process of selecting a low power state of operation of a component. Part of the selection of the state of operation includes determining if the component has a battery 154. If the component does not have a battery, it must then be determined if the component will continue to communicate with an external power source 156. In order for the component to remain in a Suspend state for an extended period of time, it requires power for the duration of the suspension. For example, if the component is intended to remain within the chassis, it can continue to receive power from the chassis during the duration it is in a Suspend state. If the query at step 156 is positive, the component may enter the suspended state of operation 158. The processor of the component is then powered down 160, and the memory of the component remains alive 162. In the Suspend state, the component continues to consume power, and therefore requires sufficient power from it's internal battery or continued power from an external power source. In order to bring the component back to a state of operation, the component must proceed through a Resume procedure. This process enables the component to return to full power expeditiously without the need for rebooting the component. Accordingly, if the component is not intended to remain in a low power state of operation for an extended period of time and is required to return to a full power state of operation in an expeditious manner, then the low power state of Suspend may be desirable.

FIG. 4 also illustrates the process of placing a component in the low power state of Hibernate. In this state, the component is not required to have a battery or communication with an external power source. When the component enters the state of Hibernate 164, the component writes it's memory to the local disc or network attached storage 166. The component then sends a marker to the operating system to indicate the placement of the component memory in the local disc or network attached storage 168. This enables the component to access it's image when the component completes the Restore procedure from the Hibernate state. Power to the processor and all power consuming accessories of the component are then turned off 170. Once the component is in a Hibernate state, it may be removed from the chassis without concern of continued power supply to the component. The component may remain in a Hibernate state for an indefinite period of time. The Hibernate component must proceed through a Restore procedure when power is returned to the component with the intention of returning the component to a full or partial power state. The Restore procedure is more time consuming than the Resume procedure associated with the Suspend state, but less time consuming that a reboot of the component. Accordingly, the low power state of Hibernate may be desirable for a long-term low power state of operation.

A compute component within a multiple component system may optionally utilize a disc for local storage if the component is in communication with a network attached storage. In a further embodiment to the Hibernate state, a component that does not include a local harddisk may also take advantage of this low power state. When a component without a harddisk initially enters the Hibernate state, it stores it's image in the network attached storage through a network address in non-volatile memory. A compute component without a local harddisk will require a chip or software on the component that emulates a local disc to the operating system. This chip or software enables communication between the component and the network attached storage. Accordingly, the chip or software enables the component to take advantage of the Hibernate state without requiring the placement of a harddisk on the component.

When a component is in either a Suspend state or a Hibernate state, the component can be removed from the chassis. This enables a component in one of these two low power states of operation to be moved from one slot in the chassis to another slot in the same chassis or a different chassis, i.e. hot-swapped. Once the component is placed in the desired location within the chassis, the component may be brought back to full power through either the Resume procedure from the Suspend state or the Restore procedure from the Hibernate state. Since both of these processes are faster than a complete reboot of the component, they are more desirable when the component is selected for a hot-swapping procedure. Accordingly, in the case of a hot-swap of a component it may be desirable to place the component into the low power state of Suspend or Hibernate depending upon the length of time the component will remain in low power and the time required to return the component to full power.

In addition to enabling hot-swapping of compute components in a low power state, compute components in a Hibernate state may access a different image from the network attached storage during the Restore function without requiring a reboot of the component. When a component enters the Hibernate state, all memory contents are written from a local disc or a SCSI extension to the network attached storage and a marker is sent to the operating system not to reboot the component when power is returned to the component. In addition, the marker functions as an indicator to the component as to the location of the memory in the network attached storage. When power is Restored to the component, the component may optionally access an alternate image on the network attached storage. It is known in a multi-component environment for different components to perform different tasks. For example, a Linux based image and a Windows based image perform different tasks. Both the Linux image and the Windows image can be stored in hibernated states on the network attached storage. As a shift in workload is determined, alternative images may be restored to the component returning from the Hibernate state. Alternative images can be restored on an as needed basis, including re-partitioning a partitioned computing system. The process of restoring alternate images is considerably faster and more efficient than rebooting and/or re-configuring compute components. Accordingly, utilization of hibernated images mitigates transition time between restoring system images.

Advantages Over the Prior Art

The low power states or operation of individual compute components, as well as granular management of power consuming accessories within a component increase operating efficiency of a multi-component computing system. Power may be managed on both a micro and a macro scale. Individual components within a system may operate in one of five levels, ranging from no power to full power, with three intermediate levels of operation. In addition, one of the intermediate levels of operation enables granular management of an individual component. The granular management of the component includes controlling operation of the individual power consuming accessories of the component. The granular management in combination with the software management system provides the ability to reduce power consumption and heat dissipation during period of low utilization, the ability to improve system configuration for alternative workloads, and the ability to schedule maintenance of individual components in a multi-component system.

In addition to granular management of accessories within a component, the power management also enables hot-swapping of components in either a Suspend or Hibernate state. Prior to returning the component to full power through either the Resume or Restore procedures, the component may be placed in a different slot within the chassis, or in a different chassis. Finally, a hibernated component may be restored to full power functioning under a different image than when it was placed in the hibernated state. When a hibernated component is restored, a software management system may be implemented to point the component to an alternative image within the network attached storage. This provides increased flexibility to the components based upon the workload of the system, without requiring a full reboot of the component to a different image. Accordingly, the power management disclosed herein provides increased operating efficiency to a multi-component computing system.

Alternative Embodiments

Figure 5:
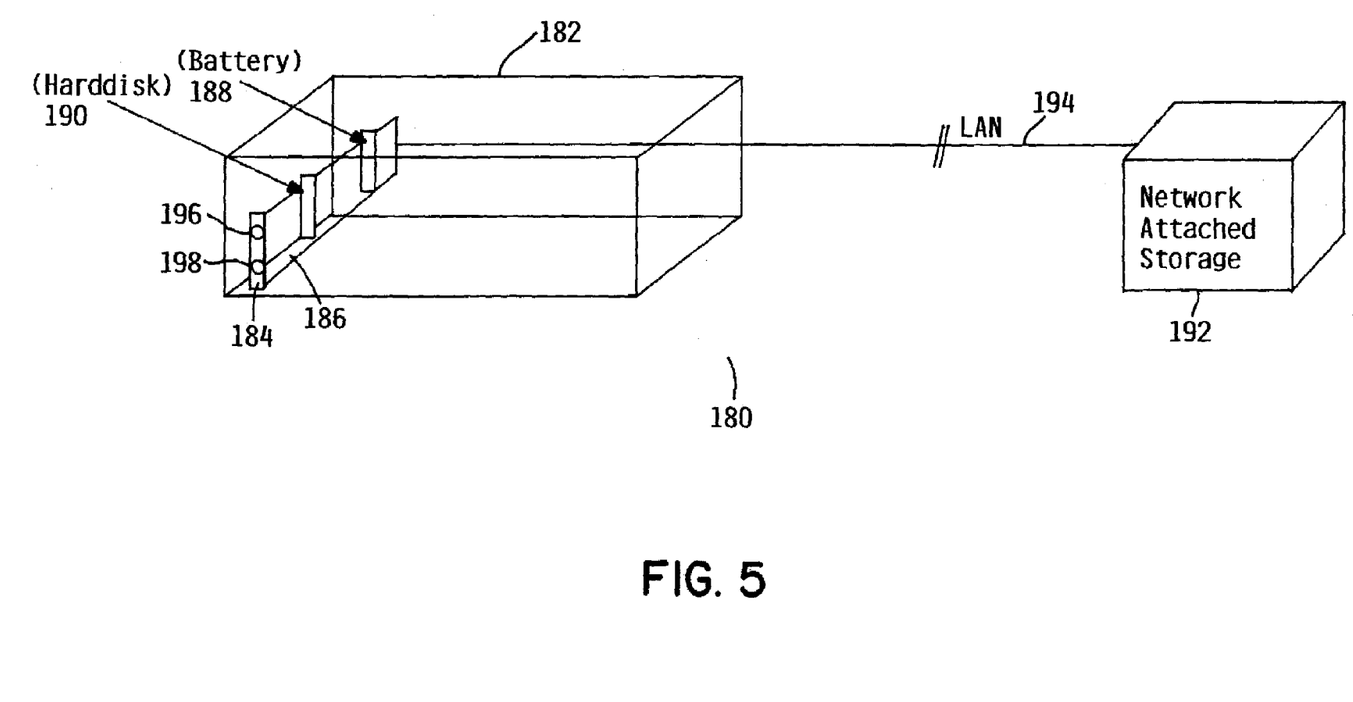
FIG. 5 is a diagram of a multi-component computer system, illustrating an alternative power management tool.

It will be appreciated that, although specific embodiments of the invention have been described herein for purposes of illustration, various modifications may be made without departing from the spirit and scope of the invention. In particular, each compute component of the system may include a manual switch in conjunction with or independent of a software management system. FIG. 5 is an illustration of a multi-component computer system 180. In this illustration, a single component 184 is shown placed in a chassis 182. The component 184 has a printed circuit board 186 which includes a local battery 188 and a harddisk 190. The component 184 has a communication port (not shown) to enable the component to be in communication with a network attached storage 192 through a local area network 194. The component 184 has a pair of buttons 196 and 198 on the front of the component. A first button 196 is used to place the component into Hibernate, and a second button 198 is used to placed the component in Suspend. When the component is operating at full power, each of the buttons 196 and 198 will illuminate in a first color to indicate full power indicating the state of operation. At such time as one of the buttons 196, 198 is activated by an operator or an external pressure source, the button 196, 198 will illuminate under a second color to indicate the component is in the process of changing it's state of operation. Once the component has completed transformation to the desired state of operation, the button 196, 198 will illuminate in a third color. Although the buttons have been shown with colors to indicate a state of operation, the buttons may also use indicia associated therewith to indicate a state of operation. Similarly, in place of buttons mounted to the component 184, a communication tool, such as a keyboard, may be used to initiate a change of the state of operations of a component. Accordingly, the scope of protection of this invention is limited only by the following claims and their equivalents.

I claim:

1. A method for managing power within a compute component of a multiprocessor system composing:

analyzing operation of said compute component within a networked computing environment having at least two compute components, wherein said operation includes component utilization;

determining if a continued operating state is required for said compute component based upon said analysis;

modifying a state of operation of said compute component in response to said determination of said required operating state, wherein one available state supports communication of an operating system image of said compute component to storage media selected from a group consisting of: local storage and network attached storage; and accessing an alternative operating system image within said network attached storage upon restoring said component from a low power state.

2. The method of claim 1, further comprising controlling granular management of a power consuming accessory within said compute component.

3. The method of claim 2, wherein said power consuming accessory is selected from the group consisting of: a microprocessor, a disk drive, I/O port, a chip, and combinations thereof.

4. The method of claim 1, wherein modifying a state of operation of said component includes changing power consumption of said compute component through a switch.

5. The method of claim 1, wherein modifying a state of operation of said compute component includes a software management system to control said state of operation of said compute component.

6. The method of claim 1, wherein said state of operation of said compute component is selected from the group consisting of: maximum power, selective reduction of a hardware accessory, suspend, hibernate, resume, restore, off, and combinations thereof.

7. The method of claim 1, further comprising hot-swapping said compute component when said component has been modified to operate in said low power state.

8. The method of claim 7, wherein said low power state is selected from the group consisting of: suspend and hibernate.

9. A multiprocessor computing system, comprising:

a plurality of computer components;

a manager adapted to analyze operation of said components within a networked computing environment having at least two compute components, wherein said operation includes component utilization;

said manager is adapted to invoke a modification of a state of operation of said component in response to said analysis, wherein one available state supports communication of an operating system image of said compute component to storage media selected from a group consisting of: local storage and network attached storage; and a storage manager adapted to instruct said component to access an alternative image stored in said network storage device during a restore function of said component from a low power state.

10. The system of claim 9, wherein said modification of a state of operation includes granular management of a power consuming accessory of said component.

11. The system of claim 10, wherein said accessory is selected from the group consisting of: a microprocessor, a disk drive, an I/O port, a chip, and combinations thereof.

12. The system of claim 9, wherein said component operates in a state selected from the group consisting of: maximum power, selective reduction of power, suspend, hibernate, resume, restore, off, and combinations thereof.

13. The system of claim 9, wherein said component is adapted to accommodate a hot-swap procedure when said component has been modified to operate in said low power state.

14. The system of claim 13, wherein said low power state is selected from the group consisting of: suspend and hibernate.

15. An article comprising:

a computer-readable medium;

a manager in said medium to analyze operation of a compute component in a multiple compute component computing environment within a networked computing environment having at least two compute components, wherein said operation includes component utilization; and a control system in the medium responsive to said manager for changing a state of operation of said computer component, wherein one available state supports communication of an operating system image of said compute component to storage media selected from a group consisting of: local storage and network attached storage, and wherein said control system accesses an alternative image within said network attached storage for said computer component when said component is returning from a low power state.

16. The article of claim 15, wherein the medium is selected from the group consisting of: a recordable data storage medium and a modulated carrier signal.

17. The article of claim 15, wherein said state of operation of said compute component is selected from the group consisting of: maximum power, selective reduction of a hardware accessory, suspend, hibernate, resume, restore, off, and combinations thereof.

18. The article of claim 17, wherein said control system is adapted to control management of a power consuming accessory within said compute component.

19. The article of claim 18, wherein said power consuming accessory is selected from the group consisting of: a microprocessor, a disk drive, an I/O port, a chip, and combinations thereof.

20. The article of claim 15, wherein said control system is adapted to accommodate a hot-swap of said compute component when said component has been modified to operate in said low power state.

* * * * *